(12) United States Patent
Yang et al.

(10) Patent No.: US 11,969,944 B2
(45) Date of Patent: Apr. 30, 2024

(54) 3D PRINTER BASED ON LIQUID-SOLID CHEMICAL REACTION DEPOSITION AND OPERATING METHODS THEREOF

(71) Applicant: SOUTH CHINA UNIVERSITY OF TECHNOLOGY, Guangzhou (CN)

(72) Inventors: Yongqiang Yang, Guangzhou (CN); Yuchao Bai, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 393 days.

(21) Appl. No.: 16/962,543

(22) PCT Filed: Oct. 25, 2018

(86) PCT No.: PCT/CN2018/111936
§ 371 (c)(1),
(2) Date: Jul. 16, 2020

(87) PCT Pub. No.: WO2019/140969
PCT Pub. Date: Jul. 25, 2019

(65) Prior Publication Data
US 2020/0353683 A1    Nov. 12, 2020

(30) Foreign Application Priority Data

Jan. 17, 2018 (CN) .......................... 201810042919.5

(51) Int. Cl.
*B29C 64/321* (2017.01)
*B22F 1/10* (2022.01)
(Continued)

(52) U.S. Cl.
CPC .............. *B29C 64/321* (2017.08); *B22F 1/10* (2022.01); *B22F 10/14* (2021.01); *B22F 12/53* (2021.01);
(Continued)

(58) Field of Classification Search
CPC ... B29C 64/165; B29C 64/364; B29C 64/371; B29C 64/25
See application file for complete search history.

(56) References Cited

U.S. PATENT DOCUMENTS

| | | | |
|---|---|---|---|
| 7,422,713 B2 * | 9/2008 | Oriakhi | B29C 64/165 264/308 |
| 10,414,089 B2 * | 9/2019 | Maier | B29C 64/112 |
| 10,758,978 B2 * | 9/2020 | Ng | B22F 1/10 |
| 10,875,240 B2 * | 12/2020 | Abbott, Jr. | B33Y 10/00 |

(Continued)

FOREIGN PATENT DOCUMENTS

| | | |
|---|---|---|
| CN | 101326046 | 12/2008 |
| CN | 104228067 | 12/2014 |

(Continued)

*Primary Examiner* — Michael M. Robinson
*Assistant Examiner* — Nicholas J Chidiac
(74) *Attorney, Agent, or Firm* — JMB DAVIS BEN-DAVID

(57) ABSTRACT

The invention discloses a 3D printer based on liquid-solid chemical reaction deposition and operating methods thereof, comprising a sealed forming chamber, a powder container, a forming container, a powder spreading mechanism, and a three-axis linkage mechanism in the sealed forming chamber. The three-axis linkage mechanism moves a nozzle in the sealed forming chamber according to a movement path planning of a control system of the 3D printer. A liquid supply device is provided outside the sealed forming chamber. The liquid supply device contains a gel-like reactant. The nozzle is a liquid nozzle. The liquid nozzle communicates with the liquid supply device through a following conduit. Through the phenomenon of solid deposition produced by chemical reaction between gel-like reactant and powder substance, following the digital model of the required part, and according to the processed movement path, the liquid nozzle is controlled to move in a selected area and continuously ejects gel-like reactant to have chemical deposition reaction with base powder substance. After (Continued)

layer-by-layer cumulative stacking with existing 3D printing additive manufacturing equipment, and after solidification, the entire part is finally formed.

5 Claims, 2 Drawing Sheets

(51) Int. Cl.
| | |
|---|---|
| *B22F 10/14* | (2021.01) |
| *B22F 12/53* | (2021.01) |
| *B29C 64/165* | (2017.01) |
| *B33Y 10/00* | (2015.01) |
| *B33Y 30/00* | (2015.01) |
| *B33Y 40/00* | (2020.01) |
| B29C 64/393 | (2017.01) |
| B33Y 50/02 | (2015.01) |

(52) U.S. Cl.
CPC ............ *B29C 64/165* (2017.08); *B33Y 10/00* (2014.12); *B33Y 30/00* (2014.12); *B33Y 40/00* (2014.12); *B29C 64/393* (2017.08); *B33Y 50/02* (2014.12)

(56) References Cited

U.S. PATENT DOCUMENTS

| | | | |
|---|---|---|---|
| 11,007,570 B2* | 5/2021 | Ng | B28B 1/001 |
| 11,090,724 B2* | 8/2021 | Ng | B22F 10/40 |
| 11,541,568 B2* | 1/2023 | Abbott, Jr. | B33Y 10/00 |
| 2005/0082710 A1* | 4/2005 | Oriakhi | C04B 28/28 |
| | | | 425/375 |
| 2005/0225007 A1* | 10/2005 | Lai | B33Y 40/20 |
| | | | 425/375 |
| 2016/0361873 A1* | 12/2016 | Maier | B29C 64/106 |
| 2018/0178447 A1* | 6/2018 | Abbott, Jr. | B22F 10/28 |
| 2018/0272560 A1* | 9/2018 | Abbott, Jr. | B28B 1/001 |
| 2019/0201975 A1* | 7/2019 | Ng | B22F 3/15 |
| 2019/0201976 A1* | 7/2019 | Ng | C04B 35/6269 |
| 2019/0201977 A1* | 7/2019 | Ng | B33Y 40/00 |
| 2019/0202127 A1* | 7/2019 | Ng | C04B 35/624 |

FOREIGN PATENT DOCUMENTS

| | | |
|---|---|---|
| CN | 104260357 | 1/2015 |
| CN | 105128128 | 12/2015 |
| CN | 105394801 | 3/2016 |
| CN | 108165961 | 6/2018 |
| CN | 207828410 | 9/2018 |
| WO | 2016137956 | 9/2016 |
| WO | 2019140969 | 7/2019 |

* cited by examiner

3D PRINTER BASED ON LIQUID-SOLID CHEMICAL REACTION DEPOSITION AND OPERATING METHODS THEREOF

CROSS-REFERENCE TO RELATED APPLICATIONS

This is the U.S. National Stage of International Patent Application No. PCT/CN2018/111936 filed on Oct. 25, 2018, which was published in Chinese under PCT Article 21(2), and which in turn claims the benefit of Chinese Patent Application No. 201810042919.5 filed on Jan. 17, 2018.

TECHNICAL FIELD

The invention relates to the field of additive manufacturing, in particular to a 3D printer based on liquid-solid chemical reaction deposition and operating methods thereof.

TECHNICAL BACKGROUND 3D printing is a common name for additive manufacturing technology. It is a technology, based on a digital model file, using powdered metal or plastic or other bondable materials, to construct objects by a method of computer-controlled accumulation of printed materials layer-by-layer after being connected to a computer (known as "layered forming method"). It is often used to make models in the fields of mould manufacturing, industrial design etc., and then gradually used in direct manufacturing of some products. There are already parts manufactured by using this technology. This technology is used in jewellery, footwear, industrial design, architecture, engineering and construction (AEC), automotive, aerospace, dental and medical industries, education, geographic information systems, civil engineering, firearms, and other fields. 3D printing technology including selective laser melting, selective laser sintering, electron beam melting, direct energy deposition, digital light processing, three-dimensional lithography, has achieved remarkable results after continuous development. The above 3D printing technologies are realized by heating powder or wire, curing resin, laminating sheet etc.

SUMMARY OF THE INVENTION

The purpose of the present invention is to overcome the above-mentioned deficiencies and shortcomings of the prior art, and to provide a 3D printer based on liquid-solid chemical reaction deposition and operating methods thereof.

The Present Invention is Achieved Through the Following Technical Solutions

A 3D printer based on liquid-solid chemical reaction deposition, comprising a sealed forming chamber 8, a powder container 14, a forming container 16, a powder spreading mechanism, and a three-axis linkage mechanism in the sealed forming chamber 8; the three-axis linkage mechanism moves a nozzle along a X-axis, Y-axis, or Z-axis direction in the sealed forming chamber 8 according to a movement path planning of a control system of the 3D printer; a liquid supply device 1 is provided outside the sealed forming chamber 8, the liquid supply device 1 contains a gel-like reactant 3; the nozzle is a liquid nozzle 13; the liquid nozzle 13 communicates with the liquid supply device 1 through a following conduit 4; during an operation, the liquid supply device 1 delivers the gel-like reactant 3 therein to the liquid nozzle 13 through the following conduit 4.

A junction of the following conduit 4 and the liquid supply device 1 is provided with a solenoid valve 5.

A base plate is provided inside the forming container 16, the base plate is driven up and down by a screw mechanism at the bottom thereof.

A powder collecting container 18 is provided on a right side of the forming container 16.

An operating method based on liquid-solid chemical reaction deposition, the method comprising the following steps:

step 1: creating a three-dimensional digital model based on a shape of a part to be processed, and then saving it in a STL format file; using slicing software to slice the three-dimensional digital model; a thickness of each slice is the same; and the slices contain profile information of the part; importing a file after slicing into movement path planning software to obtain moving path data of the liquid nozzle 13;

step 2: preparing the gel-like reactant 3 (catalyst) and base powder substance according to material properties of the part to be processed; the gel-like reactant 3 should meet requirements of chemical precipitation reaction with the base powder substance to produce the required material of the part to be processed; then setting a flow rate of the gel-like reactant 3 through a solenoid valve 5, and finally placing the gel-like reactant 3 and the base powder substance in a liquid supply tank of the liquid supply device 1 and in the powder container 14 respectively;

step 3: adjusting coordinate positions of the liquid nozzle 13 through the three-axis linkage mechanism; moving the nozzle of the liquid nozzle 13 to on top of the base plate of the forming container 16 in advance, at a slice thickness away from the base plate;

step 4: starting a processing operation; the three-axis linkage mechanism carries the liquid nozzle 13 according to the movement path planning of the control system of the 3D printer to follow the movement path data in step 1 to selectively spray the gel-like reactant 3 on the base plate; the gel-like reactant 3 in contact with the base powder substance reacts chemically and deposit to complete a processing of a formed layer of the part;

step 5: after completing step 4, lowering the base plate by a height of the slice thickness; raising powder of the powder container 14 by the height of a slice; driven by the powder brush 12 of the powder spreading mechanism, covering a surface of the formed layer with the base powder substance again to form a new base powder substance layer; the liquid nozzle 13 follows a movement path of a next layer; spraying the gel-like reactant 3 onto the new base powder substance layer on the surface of the formed layer; through a chemical reaction of the gel-like reactant 3 with the new base powder substance layer, generated substance is deposited on the surface of the formed layer to complete a processing of another formed layer of the part;

step 6: repeating steps 4 to 5 until the entire processing of the part is completed.

The gel-like reactant 3 in step 2 is a liquid gel-like reactant; the base powder substance is powder.

Compared with the Prior Process, the Present Invention has the Following Advantages and Effects The present invention successfully transforms the chemical reaction deposition effect into a processing method, and only needs to replace the laser system of the existing 3D printing additive manufacturing equipment (selective laser melting equipment) with a liquid supply device and a liquid nozzle connected to its pipeline and other related components, and realises a new type of 3D printing method. The forming purpose can be achieved through a simple structural configuration. The entire forming process is spontaneously driven by the chemical energy of the gel-like reactant ejected from the liquid supply device and the base powder substance. On one hand, the gel-like reactant can generate a solid precipitate through a chemical reaction, and on the other hand, the generated solid precipitate can be bonded together.

There is no need to provide additional heat sources, light sources etc. In addition to having the characteristics of existing 3D printing technology, it also has the characteristics of simple structure, low cost and easy implementation etc.

In the present invention, through the phenomenon of solid precipitate produced by chemical reaction between gel-like reactant and powder substance, following the digital model of the required part, and according to the processed movement path, the liquid nozzle is controlled to move in a selected area and continuously ejects gel-like reactant to have chemical precipitation reaction with base powder substance. After the method of layer-by-layer cumulative stacking with existing 3D printing additive manufacturing equipment, and after solidification, the entire part is finally formed.

According to the material of the required parts, the invention can be configured with different combinations to obtain parts of different materials such as metals, inorganic non-metals, solid organic body etc.

The entire forming process of the present invention is spontaneously promoted by the chemical energy of the two substances, so there is no need to introduce heat sources, light sources etc., and it has extremely high application potential and value.

Figure 1:
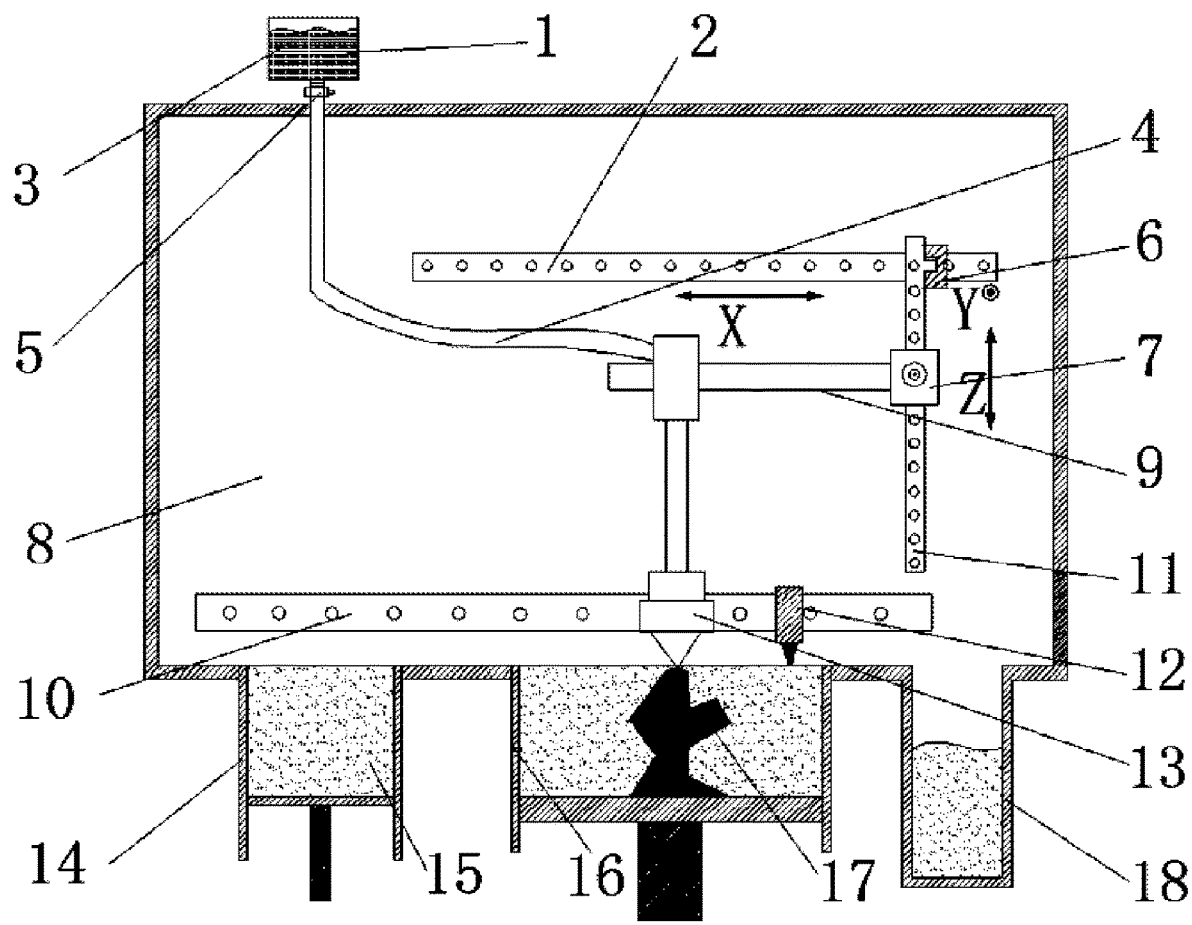
FIG. 1 is a structural diagram of a 3D printer based on liquid-solid chemical reaction deposition of the present invention.

In the figure: liquid supply device 1; X rail 2; gel-like reactant 3; follower conduit 4; solenoid valve 5; Y rail 6; slider 7; sealed forming chamber 8; clamping rod 9; powder spreading rail 10; Z rail 11; powder brush 12; liquid nozzle 13; powder container 14; powder 15; forming container 16; formed parts 17; powder collecting container 18.

DESCRIPTION

The present invention will be further described in detail below with reference to specific embodiments.

EMBODIMENTS

Figure 2:
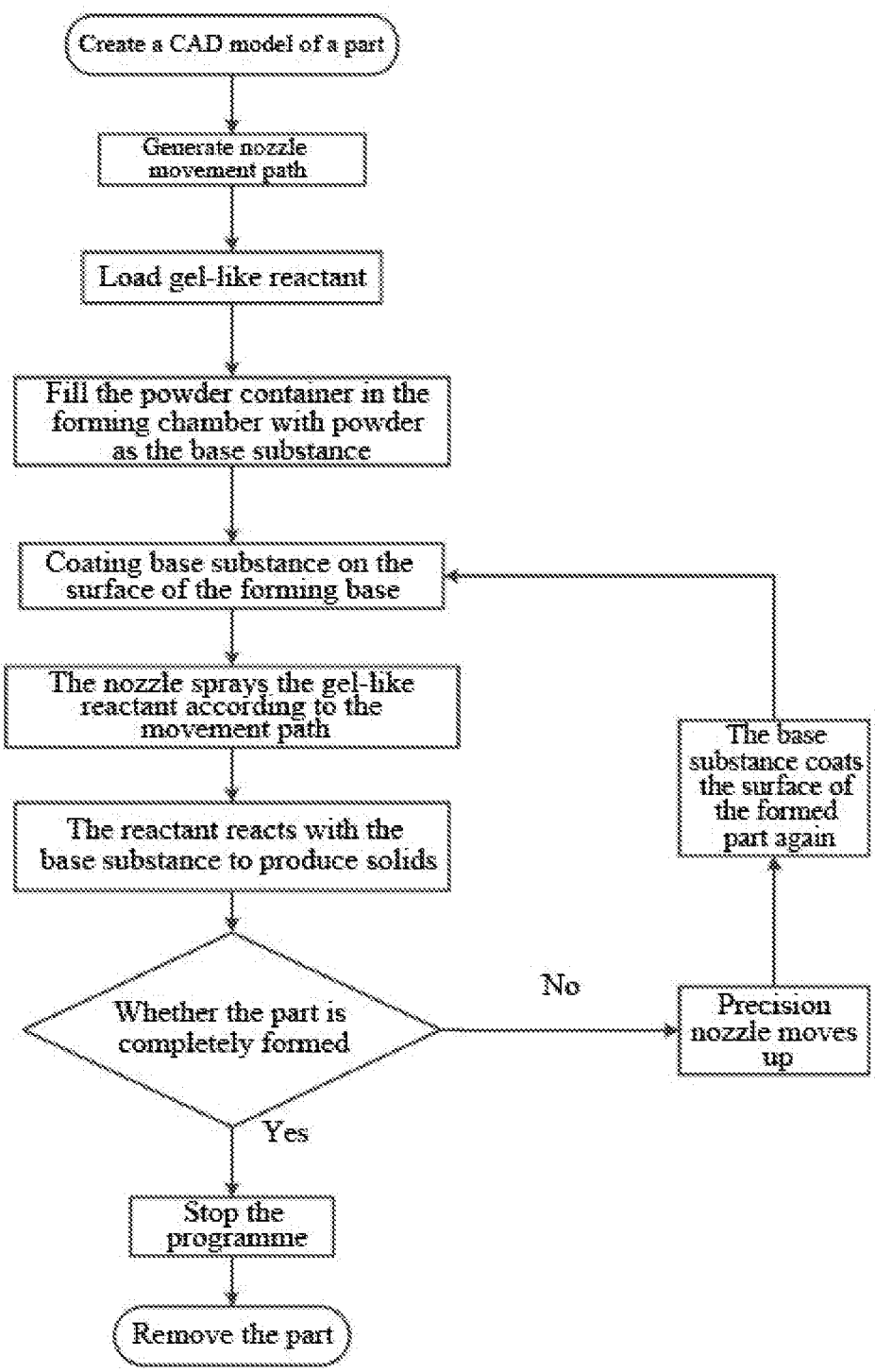
FIG. 2 is a flow chart of the operating method of the present invention based on liquid-solid chemical reaction deposition.

As shown in FIGS. 1 and 2, the present invention discloses a 3D printer based on liquid-solid chemical reaction deposition, comprising a sealed forming chamber 8, a powder container 14, a forming container 16, a powder spreading mechanism, and a three-axis linkage mechanism in the sealed forming chamber 8 etc.; the three-axis linkage mechanism moves a nozzle along a X-axis, Y-axis, or Z-axis direction in the sealed forming chamber 8 according to a movement path planning of a control system of the 3D printer;

The differences between the present invention and the existing selective laser melting equipment are that a liquid supply device 1 is provided outside the sealed forming chamber 8, the liquid supply device 1 contains a gel-like reactant 3; the nozzle is a liquid nozzle 13; the liquid nozzle 13 communicates with the liquid supply device 1 through a following conduit 4; during an operation, the liquid supply device 1 delivers the gel-like reactant 3 therein to the liquid nozzle 13 through the following conduit 4.

A junction of the following conduit 4 and the liquid supply device 1 is provided with a solenoid valve 5.

A base plate is provided inside the forming container 16, the base plate is driven up and down by a screw mechanism at the bottom thereof.

A powder collecting container 18 is provided on a right side of the forming container 16.

The operation method of the present invention based on liquid-solid chemical reaction deposition can be achieved by the following steps:

step 1: creating a three-dimensional (CAD) digital model based on a shape of a part to be processed, and then saving it in a STL format file; using slicing software to slice the three-dimensional digital model; a thickness of each slice is the same; and the slices contain profile information of the part; importing a file after slicing into movement path planning software to obtain moving path data of the liquid nozzle 13;

step 2: preparing the gel-like reactant 3 (catalyst) and base powder substance according to material properties of the part to be processed; the gel-like reactant 3 should meet requirements of chemical precipitation reaction with the base powder substance to produce the required material of the part to be processed; then setting a flow rate of the gel-like reactant 3 through a solenoid valve 5, and finally placing the gel-like reactant 3 and the base powder substance in a liquid supply tank of the liquid supply device 1 and in the powder container 14 respectively; step 3: adjusting coordinate positions of the liquid nozzle 13 through the three-axis linkage mechanism; moving the nozzle of the liquid nozzle 13 to on top of the base plate of the forming container 16 in advance, at a slice thickness away from the base plate;

step 4: starting a processing operation; the three-axis linkage mechanism carries the liquid nozzle 13 according to the movement path planning of the control system of the 3D printer to follow the movement path data in step 1 to selectively spray the gel-like reactant 3 on the base plate; the gel-like reactant 3 in contact with the base powder substance reacts chemically and deposit to complete a processing of a formed layer of the part;

step 5: after completing step 4, lowering the base plate by a height of the slice thickness; raising powder of the powder container 14 by the height of a slice; driven by the powder brush 12 of the powder spreading mechanism, covering a surface of the formed layer with the base powder substance again to form a new base powder substance layer; the liquid nozzle 13 follows a movement path of a next layer; spraying the gel-like reactant 3 onto the new base powder substance layer on the surface of the formed layer; through a chemical reaction of the gel-like reactant 3 with the new base powder substance layer, generated substance is deposited on the surface of the formed layer to complete a processing of another formed layer of the part;

step 6: repeating steps 4 to 5 until the entire processing of the part is completed.

In step 2, the gel-like reactant 3 is a liquid gel-like reactant, such as calcium chloride gel, barium chloride gel etc.; the base powder substance is powder, such as sodium carbonate powder, sodium sulphate powder, etc.

The thickness of the slice described in step 1 above is set to 0.05 to 0.3 mm according to the forming accuracy of the part.

The gel-like reactant 3 described in step 2 above should be able to have chemical precipitation reaction with the base powder substance to produce the required solid material.

The nozzle diameter of the liquid nozzle 13 can be selected in the size of 0.1 to 1.0 mm according to the accuracy requirements of the formed parts; in practical applications, the liquid nozzle 13 can be set with different nozzle diameters according to different requirements, and the nozzle can also be provided with a valve for adjusting air flow.

The base plate is located in the forming chamber and is used to fix the first layer of formed parts. The base plate is located in the forming container. During the forming process, the base plate moves vertically and the liquid nozzle 13 moves in horizontal plane.

The liquid nozzle 13 rises one slice thickness, and its specific value needs to be selected within the range of 0.05 to 0.3 mm according to the forming needs.

The parts processed by the present invention can be divided into inorganic non-metal parts, metal parts and organic parts according to the reaction product, that is, the different type of gel-like reactant 3 and the base powder substance.

As described above, the present invention can be better realized.

The embodiments of the present invention are not limited by the above embodiments. Any other changes, modifications, substitutions, combinations, and simplifications made without departing from the spirit and principles of the present invention shall be equivalent replacement methods and are included in within the protection scope of the present invention.

The invention claimed is:

1. A 3D printer based on liquid-solid chemical reaction deposition, comprising a sealed forming chamber (8), a powder container (14), a forming container (16), a powder spreading mechanism, and a three-axis linkage mechanism in the sealed forming chamber (8); the three-axis linkage mechanism moves a nozzle along a X-axis, Y-axis, or Z-axis direction in the sealed forming chamber (8) according to a movement path planning of a control system of the 3D printer; characterised in that, a liquid supply device (1) is provided outside the sealed forming chamber (8), the liquid supply device (1) contains a gel reactant (3); the nozzle is a liquid nozzle (13); the liquid nozzle (13) communicates with the liquid supply device (1) through a following conduit (4); during an operation, the liquid supply device (1) delivers the gel reactant (3) therein to the liquid nozzle (13) through the following conduit (4);

wherein the powder container (14) contains a base powder substance which chemically reacts with the gel reactant (3) to deposit to complete a processing of a formed layer;

wherein the gel reactant (3) is a liquid gel reactant, and the liquid gel reactant is calcium chloride gel or barium chloride gel;

wherein the base powder substance is powder, and the powder is sodium carbonate powder or sodium sulphate powder; and wherein the base powder substance is adapted for chemical precipitation reaction with the gel reactant (3) to produce a solid precipitate.

2. The 3D printer based on liquid-solid chemical reaction deposition according to claim 1, characterized in that, a junction of the following conduit (4) and the liquid supply device (1) is provided with a solenoid valve (5).

3. The 3D printer based on liquid-solid chemical reaction deposition according to claim 1, characterized in that, a base plate is provided inside the forming container (16), the base plate is driven up and down by a screw mechanism at the bottom thereof.

4. The 3D printer based on liquid-solid chemical reaction deposition according to claim 3, characterized in that, a powder collecting container (18) is provided on a right side of the forming container (16).

5. An operating method based on liquid-solid chemical reaction deposition, characterized in that, the method is implemented using the 3D printer based on liquid-solid chemical reaction deposition as claimed in claim 4, the method comprising the following steps:

step 1: creating a three-dimensional digital model based on a shape of a part to be processed, and then saving it in a STL format file; using slicing software to slice the three-dimensional digital model; a thickness of each slice is the same; and the slices contain profile information of the part; importing a file after slicing into movement path planning software to obtain moving path data of the liquid nozzle (13);

step 2: preparing the gel-like reactant (3) and base powder substance then setting a flow rate of the gel-like reactant (3) through a solenoid valve (5), and finally placing the gel-like reactant (3) and the base powder substance in a liquid supply tank of the liquid supply device (1) and in the powder container (14) respectively;

step 3: adjusting coordinate positions of the liquid nozzle (13) through the three-axis linkage mechanism; moving the nozzle of the liquid nozzle (13) to on top of the base plate of the forming container (16) in advance, at a slice thickness away from the base plate;

step 4: starting a processing operation; the three-axis linkage mechanism carries the liquid nozzle (13) according to the movement path planning of the control system of the 3D printer to follow the movement path data in step 1 to selectively spray the gel-like reactant (3) on the base plate; the gel-like reactant (3) in contact with the base powder substance reacts chemically and deposit to complete a processing of a formed layer of the part;

step 5: after completing step 4, lowering the forming base by a height of the slice thickness; raising powder of the powder container (14) by the height of a slice; driven by the powder brush (12) of the powder spreading mechanism, covering a surface of the formed layer with the base powder substance again to form a new base powder substance layer; the liquid nozzle (13) follows a movement path of a next layer; spraying the gel-like reactant (3) onto the new base powder substance layer on the surface of the formed layer; through a chemical reaction of the gel-like reactant (3) with the new base powder substance layer, generated substance is deposited on the surface of the formed layer to complete a processing of another formed layer of the part;

step 6: repeating steps 4 to 5 until the entire processing of the part is completed.

* * * * *